United States Patent
Emerson et al.

(10) Patent No.: US 11,254,439 B2
(45) Date of Patent: Feb. 22, 2022

(54) CATALYTIC FUEL TANK INERTING APPARATUS FOR AIRCRAFT

(71) Applicant: Hamilton Sundstrand Corporation, Charlotte, NC (US)

(72) Inventors: Sean C. Emerson, Broad Brook, CT (US); Peter A T Cocks, South Glastonbury, CT (US); Lance L. Smith, West Hartford, CT (US); Eric Surawski, Hebron, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 192 days.

(21) Appl. No.: 16/216,148

(22) Filed: Dec. 11, 2018

(65) Prior Publication Data

US 2020/0180778 A1  Jun. 11, 2020

(51) Int. Cl.
*B64D 37/32* (2006.01)
*B01J 19/00* (2006.01)
*B01J 19/14* (2006.01)

(52) U.S. Cl.
CPC .......... *B64D 37/32* (2013.01); *B01J 19/0006* (2013.01); *B01J 19/14* (2013.01)

(58) Field of Classification Search
CPC ........ B64D 37/32; B01J 19/0006; B01J 19/14
USPC ...................................................... 220/88.3
See application file for complete search history.

(56) References Cited

U.S. PATENT DOCUMENTS

| 3,847,298 A | 11/1974 | Hamilton |
| 6,235,254 B1 | 5/2001 | Murphy et al. |
| 6,887,436 B1 | 5/2005 | Fisher et al. |
| 7,192,458 B1 | 3/2007 | Harness et al. |
| 7,628,965 B2 | 12/2009 | Johnson et al. |

(Continued)

FOREIGN PATENT DOCUMENTS

| CN | 107856869 A | 3/2018 |
| EP | 3279092 A1 | 2/2018 |

(Continued)

OTHER PUBLICATIONS

Baukal, C. E.; "Gas Recirculation Systems"; Heat Exchanger Design Handbook, Multimedia Edition; ISBN: 978-1-56700-423-6; Jan. 2016; retrieved from internet: URL:http://hedhme.com/content_map/? link_id=30029&article_id=15515 [retrieved Mar. 9, 2020]. 2 pages.

(Continued)

*Primary Examiner* — Anita Nassiri-Motlagh
(74) *Attorney, Agent, or Firm* — Cantor Colburn LLP

(57) ABSTRACT

Fuel tank inerting systems for aircraft are provided. The systems include a fuel tank, a catalytic reactor arranged to receive a first reactant from a first reactant source and a second reactant from a second reactant source to generate an inert gas that is supplied to the fuel tank to fill an ullage space of the fuel tank, a heat exchanger arranged between the catalytic reactor and the fuel tank and configured to at least one of cool and condense an output from the catalytic reactor to separate out the inert gas, and a controller configured to perform a light-off operation of the catalytic reactor by controlling at least one light-off parameter and, after light-off occurs, adjusting the at least one light-off parameter to an operating level, wherein the at least one light-off parameter comprises a temperature of the catalytic reactor.

10 Claims, 7 Drawing Sheets

(56) References Cited

U.S. PATENT DOCUMENTS

| | | |
|---|---|---|
| 7,694,916 B2 | 4/2010 | Limaye et al. |
| 7,735,670 B2 | 6/2010 | Zaki et al. |
| 7,896,292 B2 | 3/2011 | Limaye et al. |
| 7,905,259 B2 | 3/2011 | Johnson et al. |
| 8,287,762 B2 | 10/2012 | Repasky |
| 8,499,567 B2 | 8/2013 | Hagh et al. |
| 8,904,669 B2 | 12/2014 | Tichborne et al. |
| 9,102,416 B1 | 8/2015 | Cutler |
| 9,144,768 B2 | 9/2015 | Tichborne et al. |
| 2004/0163826 A1 | 8/2004 | Spring |
| 2006/0134568 A1 | 6/2006 | Sun et al. |
| 2007/0054226 A1 | 3/2007 | Carroni et al. |
| 2007/0292342 A1 | 12/2007 | Hemmings et al. |
| 2008/0099618 A1 | 5/2008 | Zaki et al. |
| 2008/0128048 A1 | 6/2008 | Johnson et al. |
| 2010/0284892 A1 | 11/2010 | Grover et al. |
| 2011/0059377 A1 | 3/2011 | Scotto et al. |
| 2011/0262309 A1 | 10/2011 | Limaye et al. |
| 2014/0238501 A1 | 8/2014 | Tichborne et al. |
| 2017/0267605 A1 | 9/2017 | Tanur et al. |
| 2017/0328312 A1 | 11/2017 | Walker et al. |
| 2018/0155050 A1 | 6/2018 | Surawski et al. |

FOREIGN PATENT DOCUMENTS

| | | |
|---|---|---|
| EP | 3542888 A1 | 9/2019 |
| GB | 1395691 A | 5/1975 |
| GB | 2374007 A | 10/2002 |
| WO | 2017127478 A1 | 7/2017 |

OTHER PUBLICATIONS

European Search Report for European Application No. 19215114.0, International Filing Date Dec. 11, 2019, dated Apr. 21, 2020, 8 pages.

CATALYTIC FUEL TANK INERTING APPARATUS FOR AIRCRAFT

BACKGROUND

The subject matter disclosed herein generally relates to fuel tank inerting systems for aircraft and, more particularly, to fuel tank inerting systems configured to supply inert gas in an aircraft.

In general, aircraft pneumatic systems, including air conditioning systems, cabin pressurization and cooling, and fuel tank inerting systems are powered by engine bleed air. For example, pressurized air from an engine of the aircraft is provided to a cabin through a series of systems that alter the temperatures and pressures of the pressurized air. To power this preparation of the pressurized air, generally the source of energy is the pressure of the air itself.

The air bled from engines may be used for environmental control systems, such as used to supply air to the cabin and to other systems within an aircraft. Additionally, the air bled from engines may be supplied to inerting apparatuses to provide inert gas to a fuel tank. In other cases, the air may be sourced from compressed RAM air.

Regardless of the source, typically the air for fuel tank inerting is passed through a porous hollow fiber membrane tube bundle known as an "air separation module." A downstream flow control valve is controlled or passively operated to apply back pressure on the air separation module to force some amount of air through the membrane as opposed to flowing though the tube. Oxygen passes more easily through the membrane, leaving only nitrogen enriched air to continue through the flow control valve into the fuel tank. Typically, air separation modules employ a dedicated ram air heat exchanger in conjunction with a bypass valve.

BRIEF DESCRIPTION

According to some embodiments, fuel tank inerting systems for aircraft are provided. The fuel tank inerting systems include a fuel tank, a first reactant source fluidly connected to the fuel tank, the first reactant source arranged to receive fuel from the fuel tank, a second reactant source, a catalytic reactor arranged to receive a first reactant from the first reactant source and a second reactant from the second reactant source to generate an inert gas that is supplied to the fuel tank to fill an ullage space of the fuel tank, a heat exchanger arranged between the catalytic reactor and the fuel tank and configured to at least one of cool and condense an output from the catalytic reactor to separate out the inert gas, and a controller configured to perform a light-off operation of the catalytic reactor by controlling at least one light-off parameter and, after light-off occurs, adjusting the at least one light-off parameter to an operating level, wherein the at least one light-off parameter comprises a temperature of the catalytic reactor.

In addition to one or more of the features described above, or as an alternative, further embodiments of the fuel tank inerting systems may include a reactor-heater arranged in thermal communication with catalytic reactor, wherein the controller is configured to control operation of the reactor-heater.

In addition to one or more of the features described above, or as an alternative, further embodiments of the fuel tank inerting systems may include that the reactor-heater is at least one of an electric heater, heat tape wrapped about the catalytic reactor, current coils arranged about the catalytic reactor, a microwave heater, a cartridge heater, an eddy current or induction heater, and a heat exchanger using a hot fluid.

In addition to one or more of the features described above, or as an alternative, further embodiments of the fuel tank inerting systems may include a driving mechanism configured to drive a flow of gas through the fuel tank inerting system, wherein the driving mechanism is configured to control the space velocity through the catalytic reactor.

In addition to one or more of the features described above, or as an alternative, further embodiments of the fuel tank inerting systems may include that the driving mechanism is arranged within a recirculation loop.

In addition to one or more of the features described above, or as an alternative, further embodiments of the fuel tank inerting systems may include a heat exchanger arranged within the recirculation loop and configured to thermally connect a flow through the recirculation loop and a flow exiting the catalytic reactor.

In addition to one or more of the features described above, or as an alternative, further embodiments of the fuel tank inerting systems may include that the driving mechanism is operably connected to the controller and the driving mechanism is operated to control a space velocity through the catalytic reactor.

In addition to one or more of the features described above, or as an alternative, further embodiments of the fuel tank inerting systems may include a metering valve system operably connected to the controller, wherein the controller is configured to adjust a flow rate through the metering valve system, wherein the flow rate is at least one of a rate of flow of the first reactant and a rate of flow of the second reactant.

In addition to one or more of the features described above, or as an alternative, further embodiments of the fuel tank inerting systems may include a metering valve system operably connected to the controller, wherein the controller is configured to adjust a flow rate through the metering valve system, wherein the flow rate is at least one of a rate of flow of the first reactant and a rate of flow of the second reactant.

In addition to one or more of the features described above, or as an alternative, further embodiments of the fuel tank inerting systems may include a pump operably connected to the controller to enable control of a flow rate of the first reactant into the second reactant upstream of the catalytic reactor.

According to some embodiments, methods for performing a light-off operation of an inerting system are provided. The methods include monitoring a temperature at an outlet of a catalytic reactor, controlling at least one light-off parameter to initiate a light-off of the catalytic reactor, wherein the at least one light-parameter comprises a temperature of the catalytic reactor, detecting a temperature at the outlet of the catalytic reactor to confirm catalytic reactions within the catalytic reactor, wherein the catalytic reactions are between a first reactant and a second reactant to generate an inert gas, and adjusting the temperature of the catalytic reactor to an operating level after light-off is confirmed.

In addition to one or more of the features described above, or as an alternative, further embodiments of the methods may include that controlling the temperature of the catalytic reactor comprises increasing the temperature from the operating level to initiate the light-off and after light-off decreasing the inlet temperature to the operating level.

In addition to one or more of the features described above, or as an alternative, further embodiments of the methods may include that the temperature of the catalytic reactor is controlled by a reactor-heater.

In addition to one or more of the features described above, or as an alternative, further embodiments of the methods may include that the reactor-heater is at least one of an electric heater, heat tape wrapped about the catalytic reactor, current coils arranged about the catalytic reactor, a microwave heater, a cartridge heater, an eddy current or induction heater, and a heat exchanger using a hot fluid.

In addition to one or more of the features described above, or as an alternative, further embodiments of the methods may include adjusting a flow rate of at least one of a rate of flow of a first reactant and a rate of flow of a second reactant to adjust an air-to-fuel ratio upstream of the catalytic reactor.

In addition to one or more of the features described above, or as an alternative, further embodiments of the methods may include that the light-off is performed by decreasing the air-to-fuel ratio relative to an operating level thereof.

In addition to one or more of the features described above, or as an alternative, further embodiments of the methods may include controlling a space velocity through the catalytic reactor.

In addition to one or more of the features described above, or as an alternative, further embodiments of the methods may include that the light-off is performed by decreasing the space velocity relative to an operating level thereof.

In addition to one or more of the features described above, or as an alternative, further embodiments of the methods may include controlling a temperature of a gas upstream of the catalytic reactor.

In addition to one or more of the features described above, or as an alternative, further embodiments of the methods may include that the light-off is performed by increasing the temperature of the gas upstream of the catalytic reactor relative to an operating level thereof.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1A:
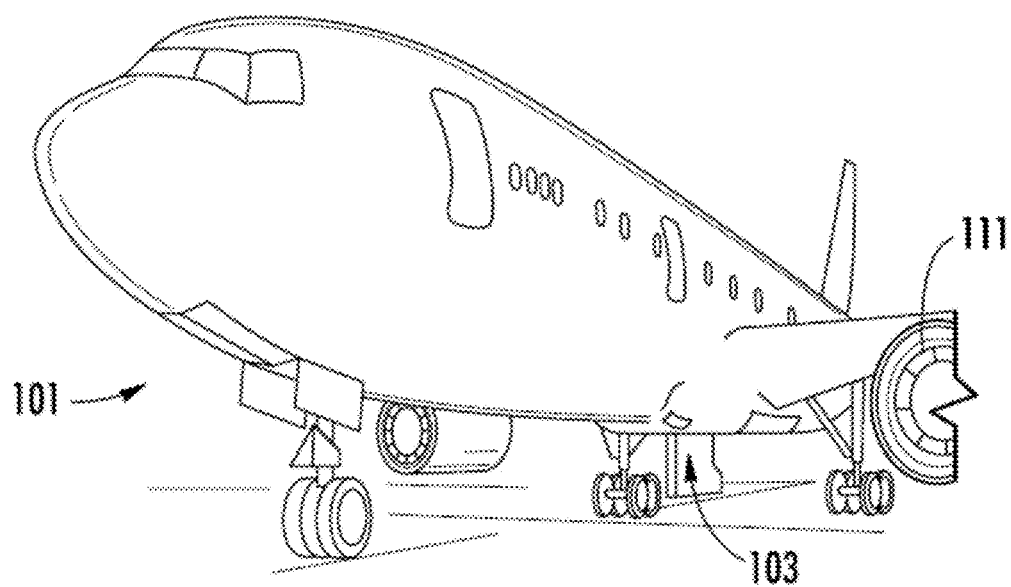
FIG. 1A is a schematic illustration of an aircraft that can incorporate various embodiments of the present disclosure.
Figure 1B:
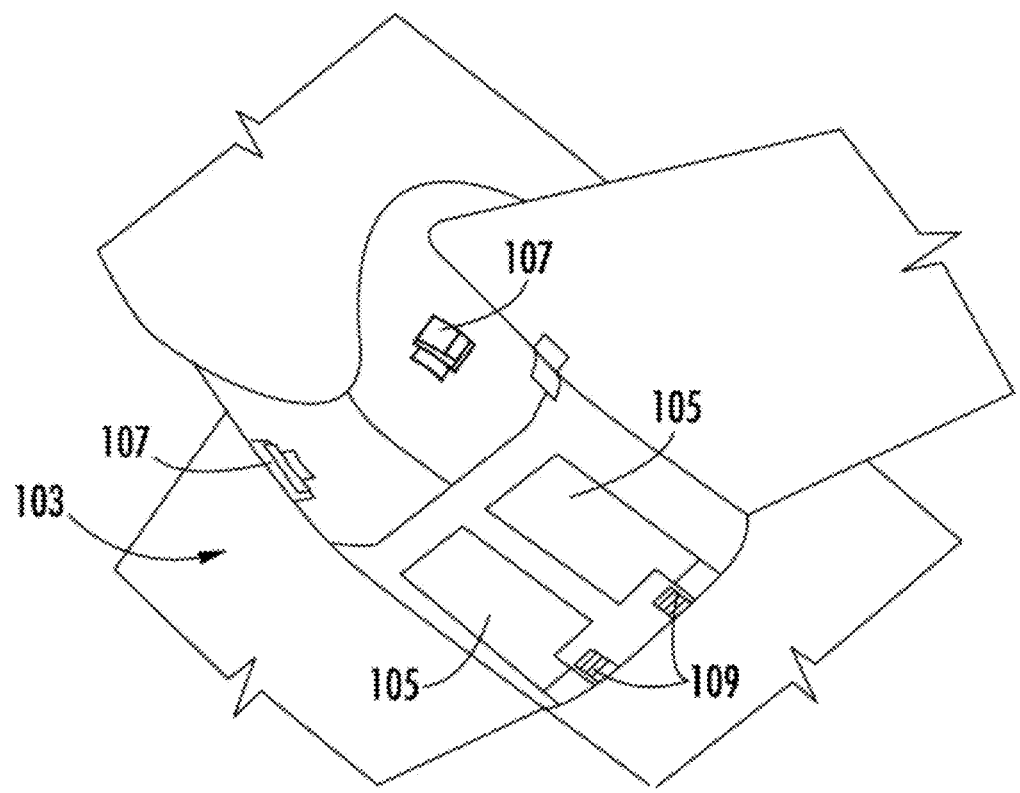
FIG. 1B is a schematic illustration of a bay section of the aircraft of FIG. 1A.

FIGS. 1A-1B are schematic illustrations of an aircraft 101 that can employ one or more embodiments of the present disclosure. As shown in FIGS. 1A-1B, the aircraft 101 includes bays 103 beneath a center wing box. The bays 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve a desired oxygen separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein provide reduced volume and/or weight characteristics of inert-gas or low-oxygen supply systems for aircraft. Further, embodiments provided herein can prevent humid air from entering fuel tanks of the aircraft, thus preventing various problems that may arise with some fuel system components. In accordance with some embodiments of the present disclosure, the typical hollow fiber membrane separator is replaced by a catalytic system (e.g., $CO_2$ generation system), which can be, for example, smaller, lighter, and/or more efficient than the typical fiber membrane separators. That is, in accordance with embodiments of the present disclosure, the use of hollow fiber membrane separators may be eliminated.

A function of fuel tank flammability reduction systems in accordance with embodiments of the present disclosure is accomplished by reacting a small amount of fuel vapor (e.g., a "first reactant") with a source of gas containing oxygen (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank. Further, in some embodiments, the fuel tank flammability reduction or inerting systems of the present disclosure can provide a functionality such that water vapor from the atmosphere does not enter the fuel tanks during descent stages of flight of an aircraft. This can be accomplished by controlling a flow rate of inert gas into the fuel tank so that a positive pressure is continuously maintained in the fuel tank.

In accordance with embodiments of the present disclosure, a catalyst is used to induce a chemical reaction between oxygen ($O_2$) and fuel vapor to produce carbon dioxide ($CO_2$) and water vapor. The source of $O_2$ used in the reaction can come from any of a number of sources, including, but not limited to, pneumatic sources on an aircraft that supply air at a pressure greater than ambient. The fuel vapor is created by draining a small amount of fuel from an aircraft fuel tank into an evaporator container. The fuel can be heated to vaporize the fuel and generate the first reactor (fuel vapor), such as by using an electric heater, as will be appreciated by those of skill in the art. The fuel vapor is removed from the evaporator container, in some embodiments, by an ejector which can induce a suction pressure that pulls the fuel vapor out of the evaporator container. Such ejectors can utilize elevated pressures of a second reactant source containing $O_2$ (e.g., a pneumatic source) to induce a secondary flow of the ejector which is sourced from the evaporator container. As such, the ejector can be used to mix the extracted fuel vapor with the $O_2$ from a second reactant source.

The mixed air stream (fuel vapor and oxygen or air) is then introduced to a catalyst, which induces a chemical reaction that transforms the $O_2$ and fuel vapor into $CO_2$ and water vapor. Any inert gas species that are present in the mixed stream (for example, Nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such an arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor. Having water (in any form) enter primary fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream (i.e., condenses an output of the catalytic reactor). The liquid water can then be drained overboard. In some embodiments, an optional water separator can be used to augment or provide water separation from the product stream.

In some embodiments, a flow control valve meters a flow of an inert gas (with water vapor removed therefrom) to a predetermined and/or controlled inert gas flow rate. Further, in some embodiments, an optional fan can be used to boost the inert gas stream pressure to overcome a pressure drop associated with ducting and flow lines between the catalyst and a fuel tank into which the inert gas is supplied. In some embodiments, a flame arrestor can be arranged at an inlet to the fuel tank (where the inert gas enters) to prevent any potential flames from propagating into the fuel tank.

Independent of any aircraft flammability reduction systems, aircraft fuel tanks are typically vented to ambient. At altitude, pressure inside the fuel tank is very low and is roughly equal to ambient pressure. However, during descent, the pressure inside the fuel tank needs to rise to equal ambient pressure at sea level (or at whatever altitude the aircraft is landing). The change in pressures requires gas entering the tank from outside to equalize the pressure. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
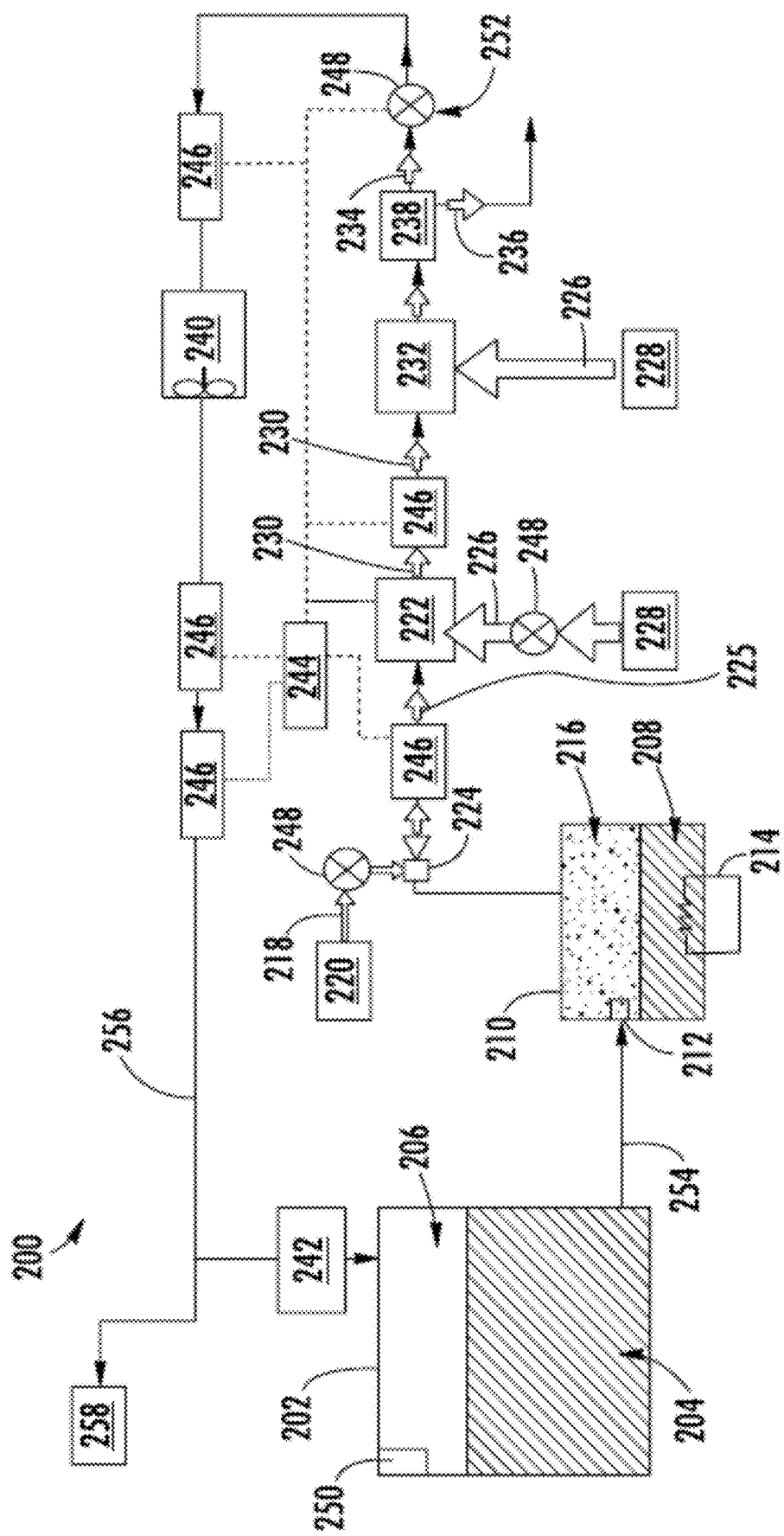
FIG. 2 is a schematic illustration of a fuel tank inerting system in accordance with an embodiment of the present disclosure.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In accordance with embodiments of the present disclosure, an inerting fuel 208 can be extracted from the fuel tank 202 and into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216. The first reactant 216 is a vaporized portion of the inerting fuel 208 located within the evaporator container 210. The first reactant 216 is mixed with a second reactant 218 which is sourced from a second reactant source 220. The second reactant 218 is air containing oxygen that is catalyzed with the first reactant 216 to generate an inert gas to be supplied into the ullage space 206 of the fuel tank 202. The second reactant 218 can come from any source on an aircraft that is at a pressure greater than ambient, including, but not limited to bleed air from an engine, cabin air, high pressure air extracted or bled from an engine, etc. (i.e., any second reactant source 220 can take any number of configurations and/or arrangements). The first reactant 216 within the evaporator container 210 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225.

The catalytic reactor 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. That is, the heat exchanger 232 may condense an output of the catalytic reactor 222. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be liquid water or water vapor, and thus in the present configuration shown in FIG. 2, a water separator 238 is provided downstream of the heat exchanger 232 to extract the liquid water or water vapor from the catalyzed mixture 230, thus leaving only the inert gas 234 to be provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in vapor phase (byproduct 236). The source of the second reactant 218 (e.g., oxygen) used in the reaction can come from any source on the aircraft that is at a pressure greater than ambient. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed gas stream 225 is hot enough to sustain the chemical reaction desired within the catalytic reactor 222, but cool enough to remove the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258, as schematically shown.

A catalytic fuel tank inerting system, such as that shown and described with respect to FIG. 2, may generate $CO_2$ (inert gas) for the fuel tank ullage by reacting a fuel-air mixture in a catalytic reactor. Reactions will only start on the catalyst surface once a minimum temperature ("light-off" temperature) has been achieved. This light-off temperature can be a function of several variables, including space velocity, fuel concentration (e.g., air-to-fuel ratio ("AFR")) and catalyst composition. As noted above, bleed air may be used as a primary air source for the catalytic fuel tank inerting concept. In certain configurations of catalytic fuel tank inerting systems, recirculation of reactor exhaust gas may be used for reactor thermal management. That is, a portion of the exhaust gas from the catalytic reactor may be recycled or reused to control thermal conditions of the catalytic reactor. This operation is enabled by the catalytic reaction during operation which generates heat, and such heat being employed to control thermal conditions of the catalytic reactor. However, there may be cases where the bleed air temperature is not high enough to initiate reaction on the catalyst at the system design point. That is, when initiating the start of the reaction within the catalytic reactor, temperatures may not be high enough to start the catalytic process.

To achieve a desired (or necessary) light-off capability, various mechanisms are proposed herein, wherein embodiments of the present invention are directed to increasing a light-off capability of a catalyst of catalytic fuel tank inerting system. For example, in some embodiments, control or manipulation of the AFR may be performed. In other embodiments, control or manipulation of the space velocity may be performed. In still other embodiments, the temperature of the inlet gas may be directly increased prior to entering the catalytic reactor. Further, in some embodiments of the present disclosure, one or more of the various mechanisms described herein may be used to control and ensure light-off of a catalytic reactor of a catalytic fuel tank inerting system. In general, embodiments of the present disclosure are directed to controlling or manipulating a light-off temperature of a catalytic fuel tank inerting system, and thus controlling an initiation or ignition efficiency of the systems.

In one non-limiting example, because a catalyst light-off temperature can be a function of the fuel concentration, the fuel flow rate can be controlled for a given air flow rate to initiate catalyst light-off if the bleed air temperature at the normal operating condition is not high enough to initiate reaction. For example, a higher fuel concentration will result in a lower air-to-fuel ratio (AFR), which in turn results in a lower light-off temperature. In such configurations, once the catalytic reactor lights-off and initiates the catalytic reaction therein, the fuel flow rate may be reduced to the normal operating condition parameters. Even with the re-increased AFR, reactions within the catalytic reactor will be sustained, such as by re-circulated exhaust gases. That is, the gas temperature required to sustain reactions within the catalytic reaction may be lower than that needed to initiate reaction in the first place, and thus the AFR may be adjusted after light-off is achieved.

Figure 3:
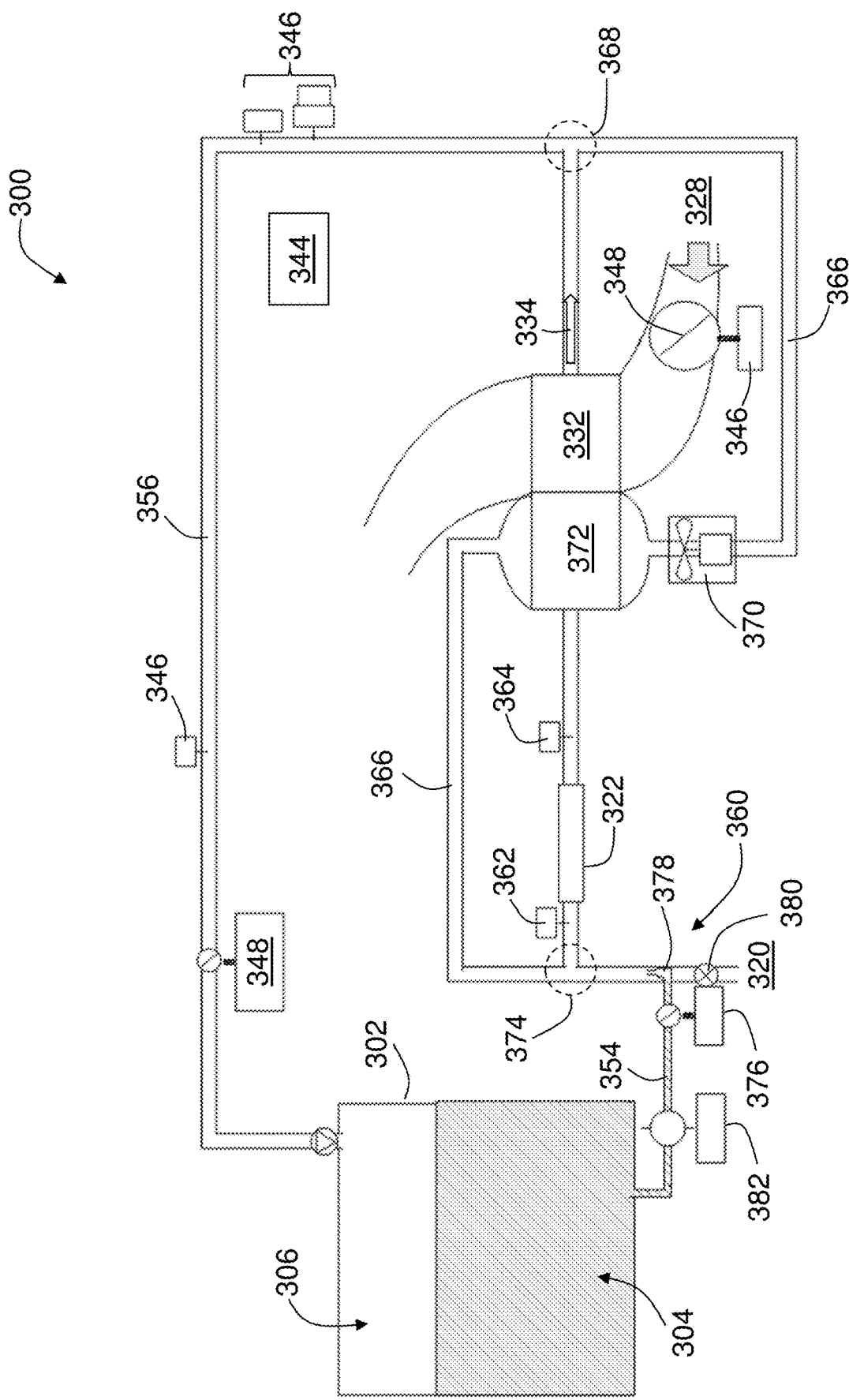
FIG. 3 is a schematic illustration of a fuel tank inerting system in accordance with an embodiment of the present disclosure.

For example, turning now to FIG. 3, an embodiment of an inerting system 300 in accordance with the present disclosure is shown. The inerting system 300 may be similar to that shown and described above, and thus similar features may not be shown or discussed for simplicity. The inerting system 300 enables control of an operating temperature of a catalytic reactor 322, specifically at a time of light-off and after light-off has been achieved.

As shown, the inerting system 300 includes a fuel tank 302 having fuel 304 therein, with an ullage space 306 formed as fuel 304 is consumed during use. In this embodiment, an inerting supply line 354 fluidly connects the fuel tank 302 to a metering valve system 360 which can inject fuel, i.e., a first reactant, into a second reactant that is sourced from a second reactant source 320. Thus the first reactant and the second reactant may be mixed. The mixed first and second reactants are then reacted within the catalytic reactor 322 to generate an inert gas for supply into one or more fuel tanks (e.g., fuel tank 302). In this embodiment, a cool air source 328, such as ram air, is provided to enable the condensing function within a heat exchanger 332, as described above. The heat exchanger 332 operates as a condenser on the catalyzed mixture to separate out an inert gas and a byproduct, such as water. The inert gas is then passed along a fuel tank supply line 356 to supply the inert gas 334 to the fuel tank 302.

The inerting system 300 further includes a controller 344 that may be operably connected to the various components of the inerting system 300, including, but not limited to, valves 348 and sensors 346, that are arranged at various locations to enable control of the inerting system 300 (e.g., to control fluid flow therethrough). The controller 344 can be configured to receive input from the sensors 346 to control the valves 348 and thus maintain appropriate levels of inert gas 334 within the ullage space 306. Further, the controller 344 can be arranged to control a light-off of the catalytic reactor 322 and ensure the reaction therein is maintained after light-off.

As shown, an inlet sensor 362 is arranged upstream of the catalytic reactor 322 and an outlet sensor 364 is arranged downstream from the catalytic reactor 322. The inlet and outlet sensors 362, 364 may be operably connected to the controller 344 such that the controller 344 can monitor inlet and outlet temperatures of the catalytic reactor 322. When the catalytic reactor 322 is generating an inert gas, the outlet temperature will be higher than the inlet temperature. However, if the catalytic reactor 322 is not operating, the inlet and outlet temperatures will be substantially similar. Thus, the controller 344 can monitor the operating status of the catalytic reactor 322. Moreover, because the inlet temperature can be monitored, the controller 344 can determine if the temperature of the mixed gas entering the catalytic reactor 322 is of sufficient temperature to cause light-off.

Once in operation, the catalytic process may be maintained, in part, through the use of a recirculation loop 366. The recirculation loop 366 is configured to extract a portion of the inert gas downstream from the catalytic reactor 322 at a first junction 368. This extracted gas is recycled back to the inlet through the recirculation loop 366. A driving mechanism 370 drives the recycled gas through the recirculation loop, passes the recycled gas through a recirculation heat exchanger 372 and then mixes the recycled gas back into the mixed first and second reactants at a second junction 374. The recirculation heat exchanger 372 is configured to thermally interact the recycled gas with the outlet gas from the catalytic reactor 322, thus heating the recycled gas. The heated recycled gas is mixed with the first and second reactants to control the temperature thereof in order to maintain an operational temperature of the catalytic reactor 322 to maintain the reaction therein. It will be appreciated that some embodiments of the catalytic process may be practiced without the need for recirculation.

If the temperature at the inlet is too low, when inert gas is required to be provided to a fuel tank, the catalytic process may not initiate. As such, the controller 344 is configured to adjust the light-off temperature, in this example embodiment, by adjusting the AFR upstream of the catalytic reactor 322. To achieve this, the controller 344 is configured to control the metering valve system 360. The metering valve system 360 includes a fuel valve 376 and a nozzle 378, with the nozzle 378 arranged to inject the first reactant (fuel) into the second reactant. The fuel valve 376 is controllable to meter an amount of fuel that is injected into the stream of the second reactant. The metering valve system 360 further may include an optional second reactant control valve 380, which can be controlled to meter an amount of second reactant sourced from the second reactant source.

By controlling the metering valve system 360, the controller 344 can manipulate the AFR, by increasing or decreasing a rate of fuel injected into the second reactant stream through controlling the fuel valve 376 and a nozzle 378. In some embodiments, the fuel valve 376 and a nozzle 378 may be a single structure, and in other embodiments (such as shown) the fuel valve 376 and a nozzle 378 may be separate devices or elements. In some embodiments, the second reactant control valve 380 may be an air metering valve that is configured to enable control of an amount of air sourced from the second reactant source 320, thus also impacting the AFR at the inlet to the catalytic reactor 322. In some such embodiments, the first reactant flow rate control elements (e.g., fuel valve 376) may be eliminated, and the AFR is controlled by the amount of second reactant introduced into the system upstream of the catalytic reactor 322.

In operation, the fuel valve 376 (e.g., a variable position fuel metering valve) can be controlled to temporarily increase the first reactant (e.g., fuel) flow rate to the system to initiate catalyst light-off. That is, as the first reactant flow rate is increased, the light-off temperature will decrease. As the light-off temperature decreases, due to the increased percentage of first reactant, light-off is more likely to occur. Once light-off occurs, the controller 344 may detect an increase in temperature at the outlet sensor 364 downstream from the catalytic reactor 322. The increased temperature may be indicative of light-off and initiation of the catalytic reactions within the catalytic reactor 322. When such increased temperatures are detected, the controller 344 may reduce the flow rate of the first reactant by controlling the metering valve system 360. That is because the temperature required to sustain the reaction within the catalytic reactor 322 may be lower than that needed to initiate reaction.

An optional component, as shown, may be a pump 382 that may be arranged between the fuel tank 302 (e.g., first reactant source) and the nozzle 378. The pump 382 may be controlled by the controller 344 to enable further control of the flow rate of the first reactant into the second reactant upstream of the catalytic reactor 322.

As described above, another factor related to light-off temperatures is space velocity. Space velocity may be represented with units of inverse hours, with the calculation of space velocity being volumetric flow rate divided by reactor volume (i.e., volume for unit time divided by volume results in inverse time). That is, for a fixed catalytic reactor volume, the hourly space velocity is directly proportional to volumetric flow rate. Since the catalyst light-off temperature can be a function of the reactor space velocity (i.e., the lower the space velocity the lower the temperature required for light off), the space velocity can be controlled to initiate catalyst light-off if the bleed air temperature at the design point is not high enough to initiate reaction.

Accordingly, some embodiments of the present disclosure are directed to approaches for controlling (decreasing) the reactor space velocity to initiate light-off. Once light-off of the catalytic reactor is achieved, the space velocity may be increased to normal operating conditions. In some embodiments, reactions will be sustained by the temperature of re-circulated exhaust gases, as described above. Also, as noted above, the temperature required to sustain reaction may be lower than that needed to initiate reaction, and thus increased space velocity after light-off may be employed.

For example, referring again to FIG. 3, instead of controlling the metering valve system 360 to control the AFR, the controller 344 may be configured to control a total flow rate or air velocity within the inerting system 300. For example, the controller 344 may be configured to control a total flow rate by operating the driving mechanism 370 at different speeds. In some embodiments, the driving mechanism 370 may be a variable speed fan or a system configuration having a bypass, such that the total flow rate within the inerting system 300 can be controlled.

In one non-limiting example, as noted, for a fixed reactor volume, the hourly space velocity is directly proportional to volumetric flow rate. For a given catalytic reactor, if the bleed air feeding the system (e.g., second reactant from second reactant source 320) is at a temperature of 185° C., the normal operating conditions of the catalytic reactor are at a space velocity of 200,000 $hr^{-1}$, and the catalyst light off temperature at this space velocity is 200° C., under this scenario the catalytic reactor would not light-off. However, if the light-off temperature is reduced below 185° C. at a space velocity of 50,000 $hr^{-1}$, light off could be achieved by reducing the reactor space velocity below 50,000 $hr^{-1}$ (reducing the volumetric flow rate through the reactor). To achieve this, the controller 344 may operate the fan or other components to reduce the total flow rate within the inerting system 300.

In operation, the inerting system 300 may be started or initiated with the driving mechanism 370 operating at a low flow rate (e.g., using a variable speed fan) or off to reduce the reactor space velocity. Because the space velocity within the catalytic reactor 322 would be low, the light-off temperature would also be low, enabling light-off to occur. Once light-off is achieved, the driving mechanism 370 can be controlled to operate at normal operating conditions sufficient to maintain the catalytic reactions. It is noted that in some embodiments, the driving mechanism 370 may be operated in connection with the metering valve system 360 shown in FIG. 3, such that as the flow rate is increased, the fuel (first reactant) flow rate may also be increased.

Figure 4:
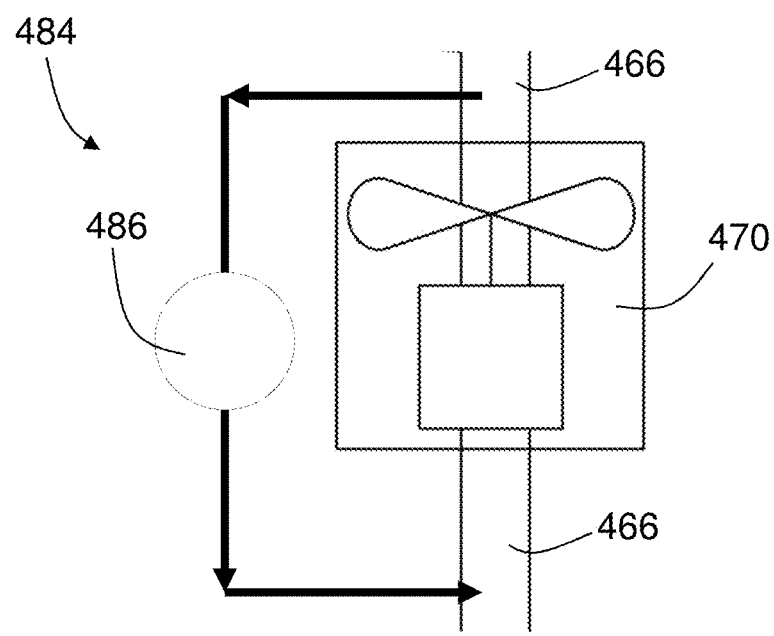
FIG. 4 is a schematic illustration of a part of an inerting system in accordance with an embodiment of the present disclosure.

Turning now to FIG. 4, an alternative mechanism for controlling space velocity in accordance with an embodiment of the present disclosure is shown. FIG. 4 is a partial illustration of a part of a recirculation loop 466 of an inerting system in accordance with the present disclosure. The inerting system may be substantially similar to that shown and described above with respect to the recirculation loop 366 in FIG. 3. FIG. 4 is illustrative of a fixed speed driving mechanism 470 that is part of the recirculation loop 466. The fixed speed driving mechanism 470 may be used to control a space velocity by implementation of a recycle bypass 484. The recycle bypass 484 can include a bypass valve 486 that is controllable by a controller (e.g., controller 344 shown and described in FIG. 3). Because the driving mechanism 470 is fixed speed, in this embodiment, to reduce a space velocity, a portion of the downstream (driven) gas maybe extracted and recycled around the driving mechanism 470. That is, by removing or extracting a portion of the gas being driven by the driving mechanism 470, the total flow rate in the inerting system may be reduced, and thus the space velocity at or in the catalytic reactor may be reduced. With the reduced space velocity, light-off may be achieved, and once achieved, the recycle bypass 484 may be closed such that the total flow rate increases to normal operating conditions.

Figure 5:
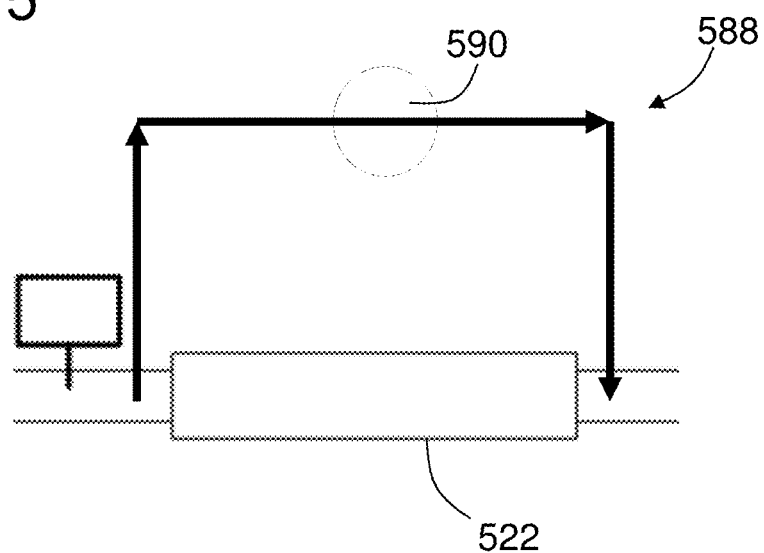
FIG. 5 is a schematic illustration of a part of an inerting system in accordance with an embodiment of the present disclosure.

Turning now to FIG. 5, an alternative mechanism for controlling space velocity in accordance with an embodiment of the present disclosure is shown. FIG. 5 is a partial illustration of a part of a catalytic reactor 522 of an inerting system in accordance with the present disclosure. The inerting system may be substantially similar to that shown and described above with respect to FIG. 3. The inerting system of FIG. 5 may incorporate a fixed speed driving mechanism, as described above, which is part of a recirculation loop. The fixed speed driving mechanism may be used to control a space velocity by implementation of a catalytic bypass 588, which arranged about the catalytic reactor 522. The catalytic bypass 588 can include a bypass valve 590 that is controllable by a controller (e.g., controller 344 shown and described in FIG. 3). Because the driving mechanism is fixed speed, in this embodiment, to reduce a space velocity, a portion of the upstream gas relative to the catalytic reactor 522 maybe extracted and bypassed around the catalytic reactor 522. That is, by removing or extracting a portion of the gas being driven by the driving mechanism, the total flow rate in the inerting system may be reduced, and thus the space velocity at or in the catalytic reactor 522 may be reduced. With the reduced space velocity, light-off may be achieved, and once achieved, the catalytic bypass 588 may be closed such that the total flow rate increases to normal operating conditions.

In some embodiments of the above described space velocity-controlled systems, because the space velocity is reduced for light-off, it may be necessary to control the amount of fuel present. That is, with a reduced space velocity, once the catalytic reaction starts, additional heat will be generated, and to control this heat to prevent excess heat potentially damaging various components of the inerting system, the amount of fuel (first reactant) input in the system may be reduced during the light-off procedure. In some configurations, a reduction in total flow (reduced space velocity) may require a reduction in first reactant flow rate in order to limit maximum temperatures within the catalytic reactor.

In another configuration, the light-off temperature may be controlled by controlling the temperature at the inlet to the catalytic reactor directly. That is, a heater or other direct thermal management device or system may be employed to raise a temperature of the gas at the inlet to the catalytic reactor such that light-off may occur. It is noted that the heater or other direct thermal management device or system of embodiments of the present disclosure may be in addition to (and different from) the heater employed to generate the fuel vapor (e.g., first reactant). That is, the presently described heater or other direct thermal management device or system of embodiments of the present disclosure is employed and controlled only for light-off, and other heaters or systems may be used within intering system for other purposes, without departing from the scope of the present disclosure.

Figure 6:
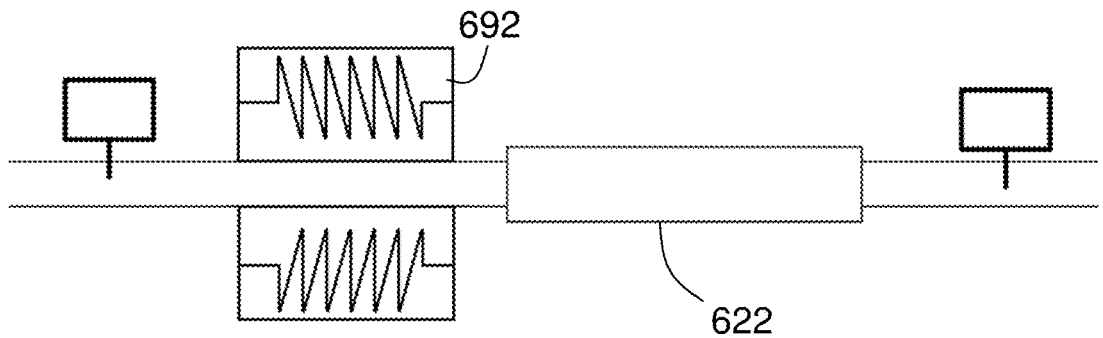
FIG. 6 is a schematic illustration of a part of an inerting system in accordance with an embodiment of the present disclosure.

For example, turning to FIG. 6, a portion of an inerting system in accordance with an embodiment of the present disclosure is shown. FIG. 6 is a partial illustration of a catalytic reactor 622 of an inerting system in accordance with the present disclosure. The inerting system may be substantially similar to that shown and described above with respect to FIG. 3. The inerting system of FIG. 6, as shown, incorporates a pre-heater 692 located upstream or proximate the inlet of the catalytic reactor 622. The pre-heater 692 may be operably connected to a controller (e.g., controller 344 shown in FIG. 3). The pre-heater 692 may be operated to directly heat and increase a temperature of gas at the inlet to the catalytic reactor 622. Once light-off has occurred, the pre-heater 692 may be deactivated as the additional heating may not be required to maintain the catalytic reaction once it has started. The pre-heater 692 may be, without limitation, heat tape or current coils arranged about the pipe upstream of the catalytic reactor 622, an electric heater (e.g., resistive wire, heating coils, cartridge heaters, microwave heaters, eddy current induction heaters, gas or other type of heater, etc.), a catalyzed igniter (e.g., resistive heating wire with a catalyst), a spark (e.g., spark plug, glow plug), a heat exchanger with a hot fluid (e.g., gas or oil), etc. In some embodiments, the pre-heater 692 may be arranged as a heat-traced pipe that is part of the flow path of the gas flowing through the inerting system. That is, in some embodiments, the heating elements of the pre-heater 692 may be part of, integrated into, and/or installed on the piping of the inerting system upstream of the catalytic reactor 622.

Figure 7:
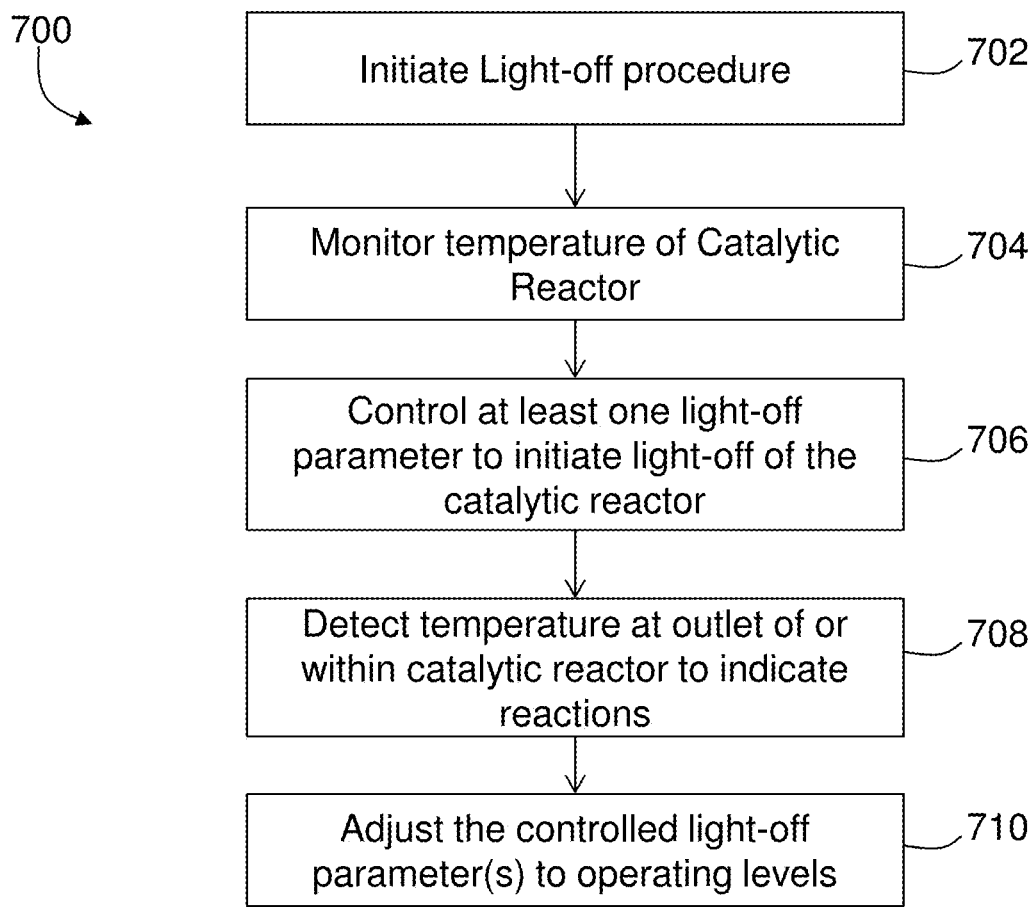
FIG. 7 is a flow process for performing a light-off operation of an inerting system for an aircraft in accordance with an embodiment of the present disclosure.

Turning now to FIG. 7, a flow process 700 for performing a light-off operation for an inerting system in accordance with an embodiment of the present disclosure is shown. The flow process 700 may be performed with one or more of the above described embodiments, or variations thereof. Further, in some embodiments, the flow process 700 may be implemented using a processor or other electronic/computer element, such as a controller, control element, or control unit (e.g., controller 244, 344 shown and described in FIGS. 2-3, above).

At block 702, a light-off procedure for a catalytic reactor in an inerting system is initiated. Initiation may occur when it is determined that an inert gas is required to be supplied into a fuel tank of an aircraft. A controller may monitor levels within the fuel tank, or some other event may trigger the need for generation of inert gas.

At block 704, an outlet temperature or internal temperature of a catalytic reactor of the inerting system is monitored. The monitoring may be performed throughout the light-off procedure, and may continue after reactions have started in the catalytic reactor. For example, the temperature may be monitored to ensure operating temperatures of the catalytic reactor are maintained within certain limits or within operating parameters. Further, additional temperature monitoring may be performed at the inlet of the catalytic reactor.

At block 706, one or more light-off parameters are controlled to initiate light-off. Specifically, the light-off parameters are related to a light-off temperature for the catalytic reactor. As described above, the light-off temperature may be impacted or influenced by air-to-fuel ratio, space velocity, or temperature of gas being fed into the catalytic reactor. Thus, the light-off parameters are air-to-fuel ratio, space velocity, and inlet gas temperature.

Depending on the configuration of the inerting system, one or more of the light-off parameters (i.e., an air-to-fuel ratio, a space velocity, and/or a temperature of gas being fed into the catalytic reactor) may be controlled or manipulated to achieve a light-off temperature of the gas. By manipulating the air-to-fuel ratio and/or space velocity the light-off temperature may be reduced to a level where the inlet gas will cause catalytic reactions to begin within a catalytic reactor. Alternatively or in combination, a temperature of gas being fed into the catalytic reactor can be directly increased to a light-off temperature. The various mechanisms operated at block 706 may be in line with that shown and described above. For example, control of a metering valve system (e.g., reduce AFR), a driving mechanism (e.g., fan to reduce space velocity), and/or a heater (e.g., increase inlet temperature) may be performed to control the light-off temperature within a catalytic reactor of the inerting system.

At block 708, the temperature at the outlet of, or within, the catalytic reactor are monitored to confirm that catalytic reactions are occurring within the catalytic reactor.

At block 710, once it is confirmed that catalytic reactions are occurring, the controlled parameter (or element) is adjusted to normal operating conditions. For example, if the light-off operation was achieved through adjustment of AFR, after light-off is confirmed and reactions are occurring, the amount of first reactant (e.g., fuel) injected into the system may be decreased, thus increasing the AFR to normal operating levels. If the space velocity is adjusted for light-off (e.g., by reducing a space velocity), after ignition of the catalytic reactions, the space velocity may be increased to normal operating levels. If temperature is adjusted at the inlet to the catalytic reactor, after light-off occurs, additional heating elements may be turned off or at least reduced in operation such that higher than necessary temperatures are not achieved at the inlet to the catalytic reactor.

Figure 8:
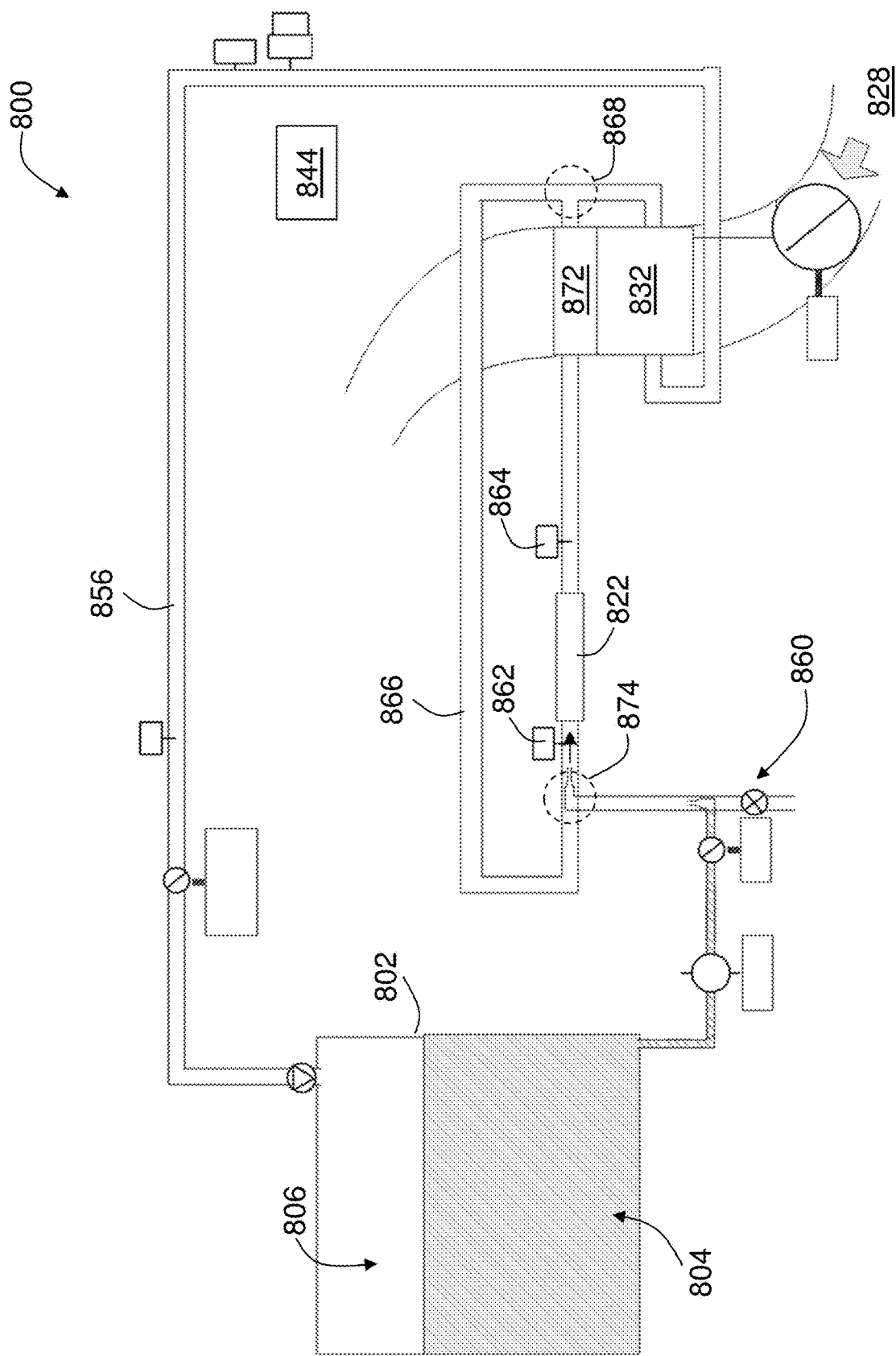
FIG. 8 is a schematic illustration of a fuel tank inerting system in accordance with an embodiment of the present disclosure.

Turning now to FIG. 8, an embodiment of an inerting system 800 in accordance with the present disclosure is shown. The inerting system 800 may be similar to that shown and described above, and thus similar features may not be shown or discussed for simplicity. The inerting system 800 enables control of an operating temperature of a catalytic reactor 822, specifically at a time of light-off and after light-off has been achieved.

As shown, the inerting system 800 includes a fuel tank 802 having fuel 804 therein, with an ullage space 806 formed as fuel 804 is consumed during use. The inerting system 800 includes a metering valve system 860, as described above, to provide fuel for the catalytic reactor 822. The metering valve system 860 may be similar to one or more of the above described embodiments. A mixed first and second reactants are reacted within the catalytic reactor 822 to generate an inert gas for supply into the ullage space 806 (e.g., within one or more fuel tanks). In this embodiment, a cool air source 828, such as ram air, is provided to enable the condensing function within a condensing heat exchanger 832, as described above. The heat exchanger 832 operates as a condenser on the catalyzed mixture. The inert gas is then passed along a fuel tank supply line 856 to supply the inert gas to the fuel tank 802.

The inerting system 800 includes a controller 844 that may be operably connected to the various components of the inerting system 800, including, but not limited to, valves and sensors that are arranged at various locations to enable control of the inerting system 800 (e.g., to control fluid flow therethrough). The controller 844 can be configured to receive input from the sensors to control the valves and thus maintain appropriate levels of inert gas within the ullage space 806. Further, the controller 844 can be arranged to control a light-off of the catalytic reactor 822 and ensure the reaction therein is maintained after light-off.

As shown, an inlet sensor 862 is arranged upstream of the catalytic reactor 822 and an outlet sensor 864 is arranged downstream from the catalytic reactor 822. The inlet and outlet sensors 862, 864 may be operably connected to the controller 844 such that the controller 844 can monitor inlet and outlet temperatures of the catalytic reactor 822. When the catalytic reactor 822 is generating an inert gas, the outlet temperature will be higher than the inlet temperature. However, if the catalytic reactor 822 is not operating, the inlet and outlet temperatures will be substantially similar. Thus, the controller 844 can monitor the operating status of the catalytic reactor 822. Moreover, because the inlet temperature can be monitored, the controller 844 can determine if the temperature of the mixed gas entering the catalytic reactor 822 is of sufficient temperature to cause light-off.

Once in operation, the catalytic process may be maintained, in part, through the use of a recirculation loop 866. The recirculation loop 866 is configured to extract a portion of the inert gas downstream from the catalytic reactor 822 at a first junction 868. This extracted gas is recycled back to the inlet through the recirculation loop 866. In this embodiment, the recirculation may be driven by the injection of the mixture of the reactants at a second junction 874. In this embodiment, a recirculation heat exchanger 872 is arranged downstream of the catalytic reactor 822 and upstream of the condensing heat exchanger 832, with the first junction 868 arranged between the two heat exchangers 872, 832. The recycled gas is reacted gas from the catalytic reactor 822 that passes through the recirculation heat exchanger 872 and then is extracted to be mixed with the first and second reactants at the second junction 374. In this embodiment, the recirculation heat exchanger 872 does not thermally interact the recycled gas with the outlet gas from the catalytic reactor 822, but rather the recycled gas is extracted prior to or upstream of the condensing heat exchanger 832. As such, the recycled gas is not cooled by the condensing heat exchanger, compared to the previously described embodiments, when mixed with the mixture of the first and second reactants at the second junction 874. The hot recycled gas is mixed with the first and second reactants to control the temperature thereof in order to maintain an operational temperature of the catalytic reactor 822 to maintain the reaction therein. It will be appreciated that some embodiments of the catalytic process may be practiced without the need for recirculation.

It will be appreciated that the light-off processes described here may be practiced using the configuration of the inerting system 800 shown in FIG. 8. That is, the controller 844 may be used to adjust the light-off temperature in accordance with any of the above described embodiments (e.g., AFR, flow rate or air velocity, and/or inlet gas temperature).

Figure 9:
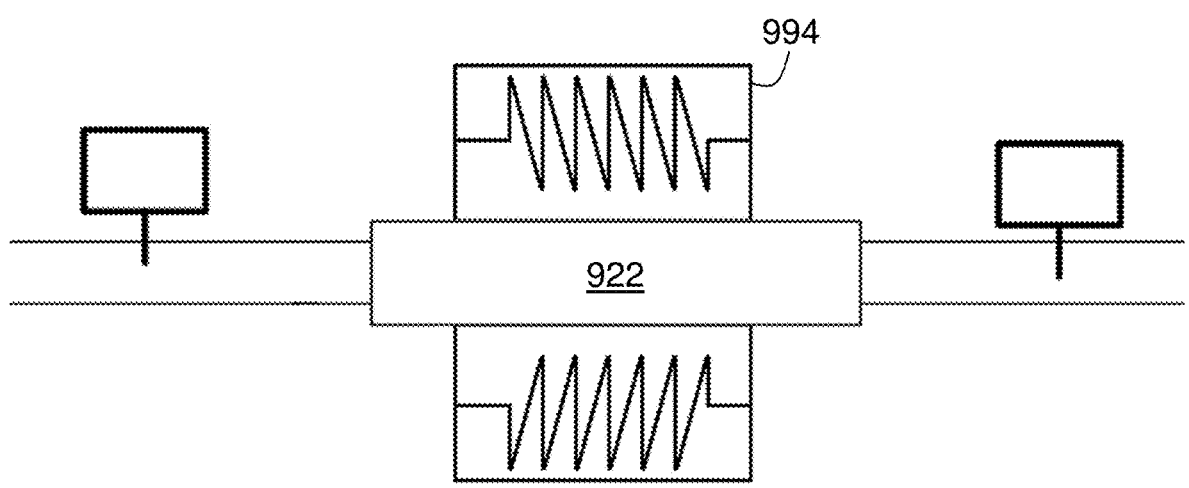
FIG. 9 is a schematic illustration of a part of an inerting system in accordance with an embodiment of the present disclosure.

Turning now to FIG. 9, a portion of an inerting system in accordance with an embodiment of the present disclosure is shown. FIG. 9 is a partial illustration of a catalytic reactor 922 of an inerting system in accordance with the present disclosure. The inerting system may be substantially similar to that shown and described above with respect to any of the above described embodiments. The inerting system of FIG. 9, as shown, incorporates a reactor-heater 994 located in thermal communication with the catalytic reactor 922. The reactor-heater 994 may be operably connected to a controller (e.g., controller 344 shown in FIG. 3). The reactor-heater 994 may be operated to directly heat and increase a temperature of the catalytic reactor 922. Such heating of the catalytic reactor 922 may increase the temperature of the catalyst itself or the gas within the catalytic reactor 922 to achieve light-off. Once light-off has occurred, the reactor-heater 994 may be deactivated as the additional heating may not be required to maintain the catalytic reaction once it has started. The reactor-heater 994 may be, without limitation, an electric heater (e.g., resistive wire, heating coils, cartridge heaters, microwave heaters, eddy current induction heaters, gas or other type of heater, etc.), a catalyzed igniter (e.g., resistive heating wire with a catalyst), a spark (e.g., spark plug, glow plug), a heat exchanger with a hot fluid (e.g., gas or oil), etc. In some embodiments, the reactor-heater 994 may be arranged as a heat-traced configuration integral with the catalytic reactor.

In some embodiments, the reactor-heater 994 may be a heat exchanger that receives hot fluid from a source external to the inerting system (e.g., hot oil, hot bleed air, etc.). In such embodiments, the catalytic reactor 922 may be arranged within or at least in thermal communication with the heat exchanger. Further, in some such embodiments, the catalytic reactor 922 may be configured as part of the heat exchanger (e.g., integral thereto). In other embodiments, direct application of heat may be applied to the catalytic reactor 922, with the reactor-heater 994 in the form of heat tape or current coils arranged about (e.g., wrapped about) the catalytic reactor 922. Further, in some embodiments, the reactor-heater 994 may be in the form of electrical wiring that applies electricity directly to metal of the catalytic reactor 922.

It is noted that a combination of the features described herein may be provided to enable light-off of a catalytic reactor of an inerting system. Thus, each of the separately described and illustrated embodiments is not to be limiting, but rather is for illustrative and explanatory purposes.

Advantageously, embodiments of the present disclosure provide for improved and efficient light-off mechanisms and operations for inerting systems on aircraft. The light-off mechanisms can be used as standalone configurations or combinations thereof may be employed. Advantageously, embodiments provided herein may be employed in situations where the gas temperature within an inerting system is insufficient to initiate light-off. Further, advantageously, embodiments provided herein enable the use of relatively cooler air (e.g., a second reactant) during normal operation by enabling light-off to be achieved while using such relatively cooler air. As such, the life of a catalytic reactor may be increased by eliminating or reducing the potential for thermal damage (e.g., operating too hot) of the catalytic reactor by having operational characteristics be less than light-off conditions, and such light-off conditions are only employed when necessary (e.g., to start catalytic reactions to generate an inert gas).

The use of the terms "a," "an," "the," and similar references in the context of description (especially in the context of the following claims) are to be construed to cover both the singular and the plural, unless otherwise indicated herein or specifically contradicted by context. The modifier "about" and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description, but is only limited by the scope of the appended claims.

What is claimed is:

1. A method of performing a light-off operation of an inerting system, the method comprising:
    monitoring a temperature at an outlet of a catalytic reactor;
    controlling at least one light-off parameter to initiate a light-off of the catalytic reactor, wherein the at least one light-off parameter comprises a temperature of the catalytic reactor;
    detecting a temperature at the outlet of the catalytic reactor to confirm catalytic reactions within the catalytic reactor, wherein the catalytic reactions are between a first reactant and a second reactant to generate an inert gas; and
    adjusting the temperature of the catalytic reactor to an operating level after light-off is confirmed,
    wherein controlling the temperature of the catalytic reactor comprises recirculating a portion of the generated inert gas through a heat exchanger to increase a temperature thereof and recycle said heated inert gas back to the catalytic reactor.

2. The method of claim 1, wherein controlling the temperature of the catalytic reactor comprises increasing the temperature from the operating level to initiate the light-off and after light-off decreasing the inlet temperature to the operating level.

3. The method of claim 1, further comprising controlling the temperature of the catalytic reactor using a reactor-heater.

4. The method of claim 3, wherein the reactor-heater is at least one of an electric heater, heat tape wrapped about the catalytic reactor, current coils arranged about the catalytic reactor, a microwave heater, a cartridge heater, an eddy current or an induction heater.

5. The method of claim 1, further comprising adjusting a flow rate of at least one of a rate of flow of a first reactant and a rate of flow of a second reactant to adjust an air-to-fuel ratio upstream of the catalytic reactor.

6. The method of claim 5, wherein the at least one light-off parameter further comprises the air-to-fuel ratio and wherein the light-off operation further comprises decreasing the air-to-fuel ratio relative to an operating level thereof.

7. The method of claim 1, further comprising controlling a space velocity through the catalytic reactor.

8. The method of claim 7, wherein the at least one light-off parameter further comprises the space velocity and wherein the light-off operation further comprises decreasing the space velocity relative to an operating level thereof.

9. The method of claim 1, further comprising controlling a temperature of a gas upstream of the catalytic reactor.

10. The method of claim 9, wherein the at least one light-off parameter further comprises the temperature upstream of the catalytic reactors and wherein the light-off operation further comprises increasing the temperature of the gas upstream of the catalytic reactor relative to an operating level thereof.

* * * * *